May 6, 1930.  J. AUBERSCHEK  1,757,554
FILTER
Filed Feb. 27, 1928   2 Sheets-Sheet 2
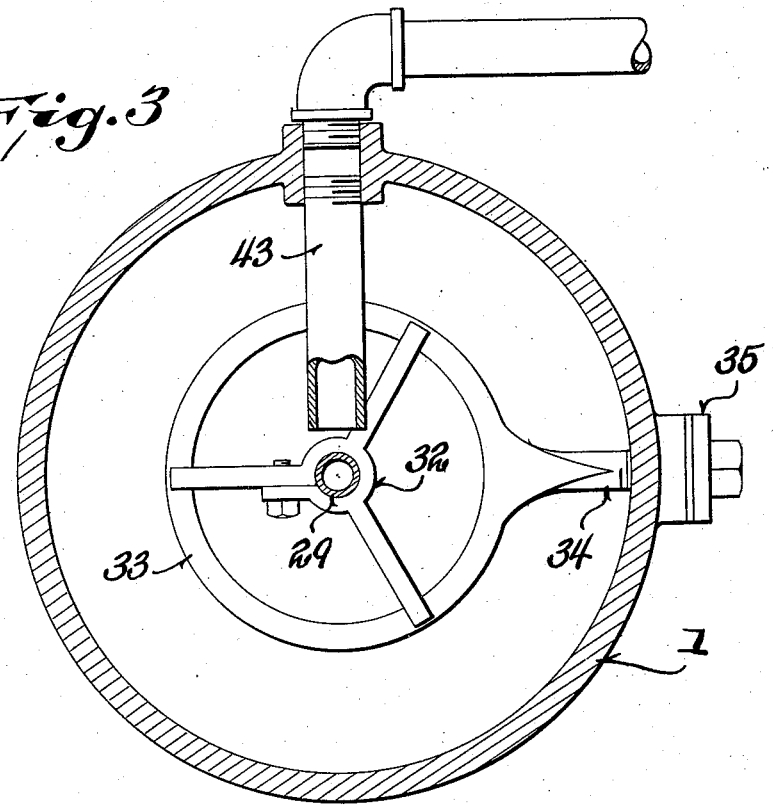
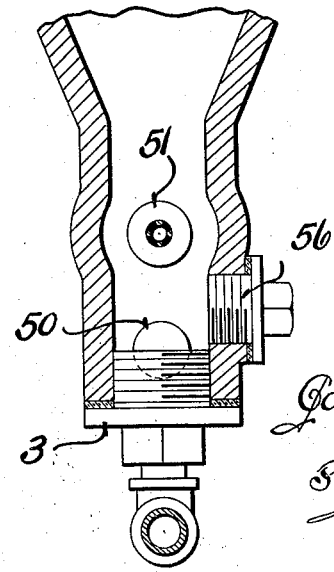
Inventor:
Joseph Auberschek Patented May 6, 1930

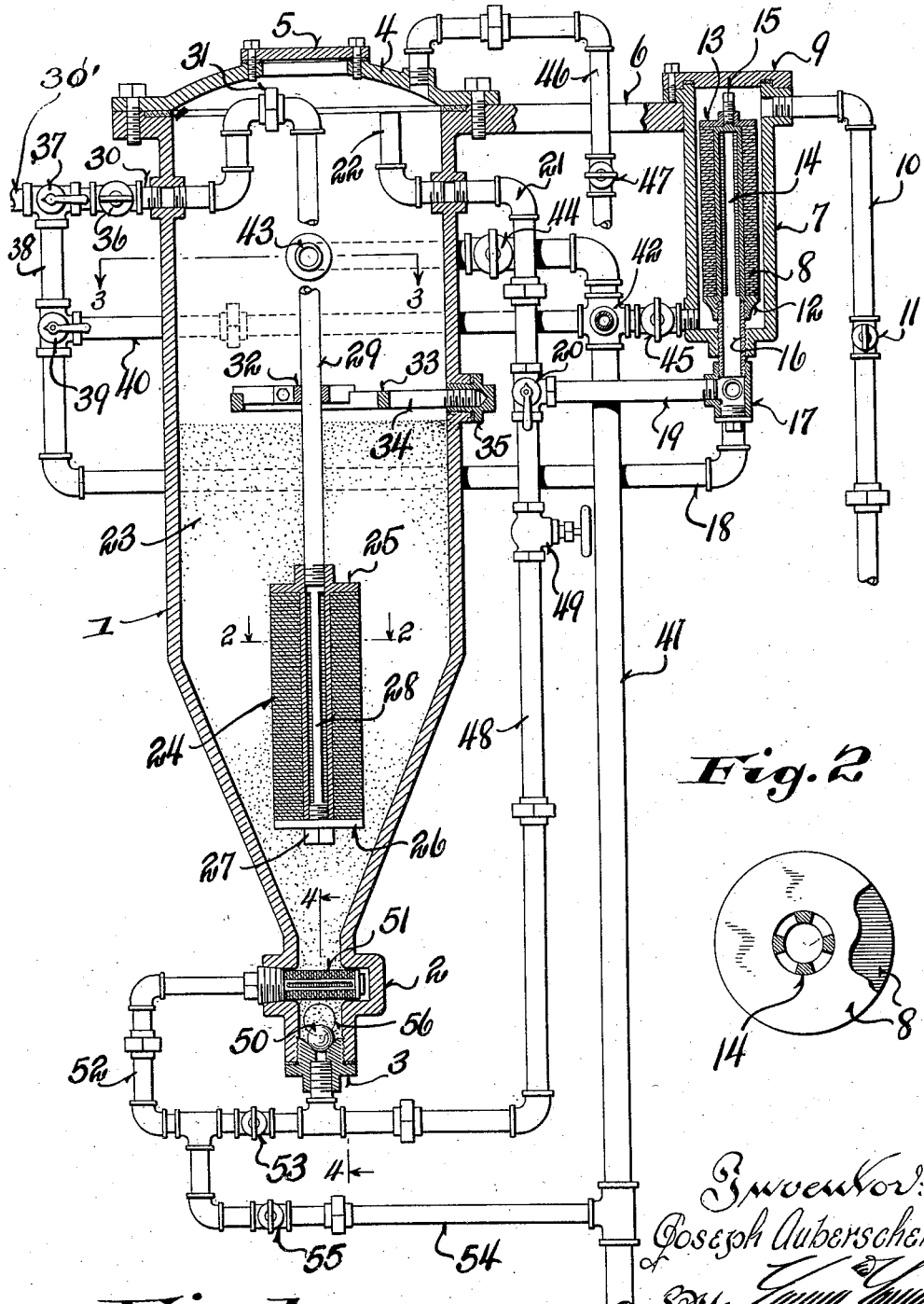

1,757,554

UNITED STATES PATENT OFFICE

JOSEPH AUBERSCHEK, OF MILWAUKEE, WISCONSIN

FILTER

Application filed February 27, 1928. Serial No. 257,312.

This invention relates to filters.

Objects of this invention are to provide a novel form of filter which is so constructed that water is passed through sand or a similar filtering agent in a manner to prevent the accumulation in the sand of large and difficultly removable particles, but which is so constructed that the flow of water may be easily reversed to cause the sand to boil up and be10 come agitated and readily free itself from the small particles which the sand has caught.

Further objects are to provide a novel form of water filter in which a pre-filtering action takes places to remove the large particles, bugs, sediment, and other matter of relatively large size, and which is provided with a sand chamber through which the pre-filtered water is passed, means being provided in the form of a removable member for preventing the outflow of sand while permitting a free outflow of water, without producing any channelling or grooved or definitely formed passageways through the adjacent portions of the sand.

Further objects are to provide a novel form of filter in which sand is employed and to so construct the filter that the sand may be easily removed or supplied, in which no sand is lost in draining the filter, and in which no sand is lost in washing.

Further objects are to provide a novel form of water filter in which the washing of the sand cleans the shell of adhering parts, and in which the incoming water may be so direct35 ed as to clean the upper portion of the shell or casing.

Further objects are to provide a filter in which every portion is removable, easily accessible, and of rugged and simple construc40 tion.

An embodiment of the invention is shown in the accompanying drawings in which:

Figure 1 is a vertical sectional view through the filter;

Figure 2 is an enlarged transverse sectional view on the line 2—2 of Figure 1;

Figure 3 is an enlarged sectional view on the line 3—3 of Figure 1;

Figure 4 is an enlarged sectional view on the line 4—4 of Figure 1.

Referring to the drawings, it will be seen that the filter comprises a main casing 1 which converges downwardly to a bottom portion provided with a transverse enlargement 2 and carrying a fitting 3. The upper portion of the main casing is closed by means of the top 4 provided with a removable cap 5, suitable gaskets, of course, being provided wherever needed, as indicated in the drawings.

The main casing is provided with a laterally projecting arm 6 which carries an auxiliary casing 7 within which a pre-filter 8 is carried. This auxiliary casing 7 is closed by a removable cover or cap plate 9. It is connected adjacent its upper end with the inlet pipe 10 for the water from the mains, such pipe being provided with a cut-off valve 11.

The pre-filter is formed by means of a plurality of washers clamped between a lower head 12 and an upper head 13. The intermediate portion is formed of a slotted tubular member 14 integral with the portion 12. The upper head 13 is screwed down against the washers and carried by a threaded projecting stem 15. This threaded projecting stem is provided at its outer end with a wrench receiving head, as indicated in Figure 1, so that the bottom 12 of this pre-filter head may be unscrewed from the threaded nipple or pipe 16, when the upper cap 9 is removed.

The pipe 16 screws into a fitting 17 from which extend pipes 18 and 19. Normally, the water flow is to the upper portion of the auxiliary casing 7, through the pre-filter, through the pipe 19 by way of the three-way valve 20, to the inlet pipe 21 of the main casing 1. This inlet pipe has an upwardly projecting portion 22, as shown in Figure 1, so as to project the water upwardly against the top of the main casing and to thereby wash the top and the sides of the main casing and keep them free of slime or other accumulation. The main casing carries a body of sand 23 within which is embedded a sand separating head 24 substantially similar to the prefilter 8. This head consists of a plurality of washers clamped between an upper flanged member 25 and a lower member 26. The member 26 may be held in place by means of the bolt 27 threaded into the slotted pipe 28 forming the interior of this head. The head is embedded in the sand and is connected with the upwardly projecting pipe 29, so that the filtered water passes upwardly through such pipe to the discharge pipe 30. It is connected to the discharge pipe by means of a union 31 immediately below the removable cap 5. The central pipe 29 is clamped to a center spider 32 which is provided with notched arms centered by means of a ring 33. The ring 33 is provided with a projecting arm 34 which screws into the side of the main casing or into a fitting 35. The details of this ring and centering spider are shown clearly in Figures 1 and 3.

This ring has the additional function of preventing the sand from being lifted bodily upwardly to the wash-out or discharge pipe, hereinafter described. It is positioned immediately above the top of the sand under normal conditions and is spaced a slight distance thereabove, as shown in Figure 1. Upon reverse washing of the sand, as hereinafter described, the sand contacts with the ring and spider and is prevented from bodily rising. In addition to this, any particles of sediment or caked sand are broken up by striking against the ring and spider.

The outwardly extending supply pipe 30 for the filtered water is provided with a cut-off valve 36 and with a three-way valve 37 which connects it with a short pipe 38. The pipe 38 is connected by means of a three-way valve 39 with the pipe 18 and with a pipe 40 leading to the main waste pipe 41.

Under normal conditions, as during filtering, the valves are in the position shown in the drawings. Water passes upwardly through the pipe 10 through the pre-filter, through the pipe 19, through the valve 20 and pipe 21, and is discharged upwardly in the interior of the main casing 1. The water then passes downwardly through the sand and through the head 24 and upwardly through the pipe 29 to the filtered water discharge pipe 30, flowing past the valves 36 and 37, to the pipe 30'.

It is to be noted also that the main waste pipe 41 is provided with a fitting 42 which connects with the discharge or wash-out pipe 43 (see Figures 1 and 3). This pipe extends transversely into the main casing 1 and ends approximately at its center, as indicated in Figure 3. It is provided with a cut-off valve 44, as shown in Figure 1, such valve being normally closed.

Further, the fitting 42 is connected to the pipe 40 and by way of a cut-off valve 45 to the interior of the auxiliary casing 7 for a purpose hereinafter to appear. The fitting 42 is further connected to an air vent or discharge pipe 46 leading through the top 4 of the main casing 1, such pipe being provided with a cut-off valve 47. The three-way valve 20 may also establish communication between the pipe 19 and the downwardly extending pipe 48. This downwardly extending pipe is provided with a needle valve 49, whereby the flow through such valve may be very accurately controlled for a purpose hereinafter to appear. The pipe 48 is connected to the fitting 3 previously described. It is to be noted that this fitting forms a valve seat for a ball valve 50. The ball valve is in actual contact with the lower portion of the sand carried in the main casing 1, as shown in Figure 1.

The enlargement 2 of the main casing is provided with a draining head 51 similar to the head 24, previously described. The interior of this filtering head 51 is connected by means of the pipe 52 with the pipe 48 and communication with such pipe is controlled by means of the cut-off valve 53. The pipe 52 is also connected to the pipe 54 leading to the waste pipe 41, and communication is controlled by the cut-off valve 55.

Each of the heads 8, 24, and 51 is formed as stated of a plurality of washers clamped with their flat faces in contact and surrounding a slotted tubular member. This is very clearly shown in Figures 1 and 2. The purpose of this construction is to provide a very extensive body having a multitude of minute slots therethrough to permit the free flow of water between the washers, although they are clamped together. However, in the case of the pre-filter head 8, solid materials carried by the water are restrained from passing into the main casing 1 and a pre-filtering action takes place. In the case of the heads 24 and 51, this construction guards against the discharge of sand into these heads, while still permitting free circulation of water therethrough.

The construction is such that the possibility of channelling in the sand by definitely directed streams of water is wholly avoided, as the water merely seeps with considerable freedom through the heads and does not dislodge the sand or form channels therein. Further, none of the sand can pass into these heads, as stated.

In addition to the constructions described, the lower portion of the main casing 1 is provided with a sand discharge plug 56 (see Figure 4). When it is desired to discharge the sand, as in the event that it is wished to renew the sand, the plug 56 is merely removed and the sand allowed to pass outwardly through the opening. The interior of the main casing may be readily washed by allowing water to flow thereinto and new sand may be added after the removal of the cap or plate 5.

The normal direction of flow of water has been described as during the actual filtering process. It is to be noted that the pre-filter catches any large particles of material and prevents their passage into the sand bed of the main casing. However, when it is desired to wash this pre-filter, it is merely necessary to open the cut-off valve 45 and to rotate the threeway valve 20 to a position closing the pipe 19. Water is then allowed to rush from the supply pipe 10 through the space between the outer side of the pre-filter and the inner side of the auxiliary casing 7. This rushing water carries all of the dislodged or accumulated solid particles with it into the waste or drain pipe 41. When this washing has continued a sufficient length of time, the valve 45 is closed and the valve 20 moved to its position, as shown in Figure 1, to reestablish communication between the pipes 19 and 21.

When it is desired to reverse the flow of water through the entire body of the sand carried in the main casing, the valve 20 is turned into a position to connect the pipes 19 and 48. Water now passes downwardly through the pipe 48 and its flow is accurately controlled by the setting of the needle valve 49. Water passes upwardly through the valve seat or fitting 3 and dislodges the ball valve 50. The water passes upwardly through the sand 23 and causes the sand to boil and loosen itself and free itself from the small particles of material caught by the sand. These small particles are washed upwardly with the upwardly passing stream of water. The cut off valve 36 is closed under these conditions and the valve 44 is opened. The water flows through the pipe 43, to the waste pipe 41, and the agitated sand freeing itself from the small particles, caught thereby, permits these small particles to flow into the waste pipe and thus the sand is thoroughly cleaned.

The purpose of the needle valve 49 is to accurately control the flow of water in the reverse flow through the filter during washing of the sand and consequently to control the amount of agitation permitted the sand. The sand rises to a certain extent but encounters the ring 33 and spider 32, and any caking of the sand is broken up by striking against this ring and the spider. Further than this, the motion of adjacent portions of the sand thoroughly breaks up any caked material which may form in the sand and thus permits complete cleaning of the sand.

It is desirable at times to reverse the flow of water through the main head 24. This is readily accomplished by turning the valve 39 into a position to connect the pipes 38 and 18 and by turning the three-way valve 37 into a position to connect the pipes 30 and 38. Water now flows through the pre-filter, through the pipes 18, 38, and 30, and downwardly through the pipe 29. It passes outwardly between the washers forming the head 24 and thus the washers are thoroughly cleaned, the valve 44 being opened.

After the cleaning of the sand or other portions of the filter, it is desirable to pass the first of the filtered water to the waste pipe. This is readily accomplished by turning the three-way valve 37 to a position connecting the pipes 30 and 38, and by turning the three-way valve 39 to a position connecting the pipes 38 and 40. This permits the first of the filtered water to pass to the waste pipe.

It may be desirable to drain the filter at times, for instance, when the house or building is to be left unoccupied for a material length of time and to prevent freezing. This is accomplished by cutting off the water at the valve 11 in the main supply pipe and by opening the valve 55, and by opening the vent valve 47 in the pipe 46. This permits water to drain through the head 51 in the lower portion of the vent and into the waste pipe and thus permits complete draining of the filter. If it is desired to drain the pipes supplied with the filtered water, it is merely necessary to turn the valve 37 into a position connecting the filtered water pipes 30' with the pipe 38. The valve 39 is then turned to connect the pipe 40 with the pipe 38 and the spigots are, of course, opened. This allows water to drain from the pipes supplied with the filtered water into the waste pipe.

When it is desired to reverse the flow of water through the head 51, this may be accomplished very readily by closing the valve 36 leading to the supply pipes and by turning the three-valve way valve 20 to a position connecting the pipes 19 and 48 and by opening the valve 53. This allows water to flow from the pre-filter, through the pipes 19, 48, and 52 and reversely through the head 51. It is well known that air collects in devices of this type due to the separation of the air from the water. It is preferable, therefore, to open the vent valve 47 once a day to allow the collected air to escape.

It will be seen that a novel form of filter has been provided in which a sand bed is employed and in which a plurality of novel types of heads are associated with the sand bed. One of the heads act as a pre-filter to prevent large particles from passing to the sand, another of the heads acting to prevent the passing of the sand into the pipes supplied with the filtered water, and the third of the heads preventing the discharge of the sand when the device is drained.

It will be seen further that all of the parts of the filter are readily removable for inspection, repair or renewal, and it will be seen further that the interior of the different parts forming the filter may be readily cleaned by washing with the supplied water or with the pre-filtered water, as described in detail above.

It will be seen further that the filter is eminently practical and is easy to construct and to operate.

Although the invention has been described in considerable detail, such description is intended as illustrative rather than limiting as the invention may be variously embodied and as the scope of such invention is to be determined as claimed.

I claim:

1. A water filter comprising a casing adapted to contain a filtering agent, means for introducing water above said filtering agent, a head located within the casing and imbedded within the filtering agent, an outlet pipe connected with the interior of the head, a normally rigid member removably connected to the casing and embracing the outlet pipe at a point above the filtering agent to break up the filtering agent upon displacement and a waste pipe communicating with the interior of the casing above the filtering agent.

2. A water filter comprising a casing adapted to contain a filtering agent, means for introducing water above said filtering agent, a head located within the casing and embedded within the filtering agent, an outlet pipe connected with the interior of the head, a spider bolted to the outlet pipe and having radially projecting arms formed with notches at their outer ends, a ring surrounding the outlet pipe and disposed within the notches within the arms, a projecting arm carried by the ring and a removable fitting carried by the side of the casing and adapted to removably receive the outer end of said projecting arm.

In testimony that I claim the foregoing I have hereunto set my hand at Milwaukee, in the County of Milwaukee and State of Wisconsin.

JOSEPH AUBERSCHEK.